(12) United States Patent
Suzuki et al.

(10) Patent No.: US 6,526,630 B2
(45) Date of Patent: Mar. 4, 2003

(54) SEAT BELT DEVICE

(75) Inventors: Yukio Suzuki, Fujisawa (JP); Kazuo Yamamoto, Fujisawa (JP); Osamu Kawai, Fujisawa (JP)

(73) Assignee: NSK Autoliv Co. Ltd., Tokyo (JP)

( * ) Notice: Subject to any disclaimer, the term of this patent is extended or adjusted under 35 U.S.C. 154(b) by 0 days.

(21) Appl. No.: 09/771,998

(22) Filed: Jan. 30, 2001

(65) Prior Publication Data

US 2001/0014997 A1 Aug. 23, 2001

(30) Foreign Application Priority Data

Feb. 7, 2000 (JP) ........................... 2000-029197
Jun. 8, 2000 (JP) ........................... 2000-172190

(51) Int. Cl.⁷ ............................................. A44B 11/25
(52) U.S. Cl. ................... 24/265 BC; 24/197; 24/198; 280/801.1; 280/808; 297/483
(58) Field of Search ................. 24/163 R, 171, 24/190, 191, 194, 197, 265 AL, 265 BC, 265 EC; 280/801.1, 806, 808; 297/476, 479, 483

(56) References Cited

U.S. PATENT DOCUMENTS

| 4,369,931 | A | * | 1/1983 | Fohl | 280/808 X |
| 4,527,313 | A | | 7/1985 | Sylven et al. | 24/464 |
| 4,582,340 | A | | 4/1986 | Fohl | 280/808 |
| 4,618,165 | A | | 10/1986 | Seifert et al. | 280/808 |
| 5,513,880 | A | * | 5/1996 | Ohira et al. | 280/808 |
| 5,768,753 | A | * | 6/1998 | Mondel | 24/265 BC |
| 5,918,903 | A | * | 7/1999 | Ito | 280/801.1 |
| 6,138,328 | A | | 10/2000 | Iseki | 24/197 |
| 6,217,070 | B1 | * | 4/2001 | Kopetzky et al. | 280/808 |
| 6,267,410 | B1 | * | 7/2001 | Koketsu et al. | 280/801.1 |
| 6,290,259 | B1 | * | 9/2001 | Dobot et al. | 280/808 |
| 6,315,328 | B1 | * | 11/2001 | Iseki et al. | 280/808 |
| 6,324,730 | B1 | * | 12/2001 | Iseki | 24/197 |
| 6,382,672 | B1 | * | 5/2002 | Minami et al. | 280/801.1 |
| 6,405,412 | B1 | * | 6/2002 | Bell | 24/265 BC |

FOREIGN PATENT DOCUMENTS

GB          2 255 897 A     * 11/1992  ................. 280/808

* cited by examiner

Primary Examiner—J. J. Swann
Assistant Examiner—Ruth C. Rodriguez
(74) Attorney, Agent, or Firm—Crowell & Moring LLP

(57) ABSTRACT

In a seat belt device comprising a webbing restraining a body of an occupant to a seat and a webbing guide for guiding the webbing in such a manner that the webbing guide comes into slide contact with the webbing, the webbing guide includes an insert fitting, a covering resin which covers the insert fitting by molding, and a metal member with which the webbing comes into slide contact, and the metal member has a surface thereof which comes into contact with the webbing protruded than the covering resin toward a webbing side.

17 Claims, 13 Drawing Sheets

SEAT BELT DEVICE

BACKGROUND OF THE INVENTION

1. Field of the Invention

The present invention relates to a seat belt device which restrains a body of an occupant sitting on a seat of an automobile or the like to the seat in case of emergency, for example, and more particularly to a seat belt device provided with a webbing which restrains the body of the occupant to a seat and a webbing guide which comes into slide contact with the webbing and guides the webbing.

2. Description of the Prior Art

Conventionally, as a seat belt device for restraining an occupant on a vehicle or the like to a seat, there has been a three-point-system seat belt device which adopts a continuous webbing.

FIG. 14 shows such a seat belt device 210. A webbing 211 of the seat belt device 210 has one end portion thereof wound in a retractor 212 such that the webbing 211 can be pulled out from the retractor 212 and other end portion thereof anchored to an anchor plate 214 pivotally mounted on a lower portion of a center pillar 213 by way of a through anchor 215 which constitutes a webbing guide. The webbing 211 has a through tongue 216 disposed between the anchor plate 214 and the through anchor 215 engaged with a buckle 218 mounted in an erected posture in the vicinity of a seat 217 in a carbody. Due to such a constitution, the webbing 211 can restrain the occupant (not shown in the drawing) to the seat 217.

In addition to the through anchor 215 and the through tongue 216 described above, the seat belt device 210 is provided with a through belt, a webbing guide at an outlet of the retractor and the like not shown in the drawing as webbing guides for guiding the webbing 211. Belt slots in an elongated hole shape are respectively formed in the webbing guides and the belt slots come into slide contact with webbing 211 which passes through the belts slots so as to guide the webbing 211.

To ensure the favorable performance of winding the webbing 211 and the favorable manipulation feeling at the time of drawing the webbing 211, it is necessary to suppress the friction resistance at a slide contact portion between the belt slot and the webbing 211 as small as possible. To that end, the surface treatment has been applied to the slide contact portion such that the shape of the surface of the slide contact portion is made smooth by covering resin thereon or a fluorine-based paint having a favorably small friction resistance is coated on the slide contact portion.

Among the webbing guides, the through anchor 215 can be formed, for example, by an insert molding such that an insert fitting is covered with a covering resin by molding. Since the through anchor 215 has to bear a load at the time of collision of a vehicle, the through anchor 215 is required to ensure a sufficient mechanical strength to prevent the deformation thereof when the load is applied to the through anchor 215.

With respect to the through anchor formed by an insert molding such that an insert fitting is covered with the covering resin by molding, depending on a molding material, there has been a possibility that as the user uses the seat belt device repeatedly, the friction resistance between the through anchor and the webbing is increased and this ill-affects the webbing winding performance.

Accordingly, to solve such a problem, U.S. Pat. No. 4,618,165 specification discloses a webbing guide which is formed by press-forming a metal sheet and exhibits a low friction and has a high mechanical strength and a high durability. However, this webbing guide is manufactured from a metal plate by a press forming and hence, it extremely pushes up the manufacturing cost compared with the above-mentioned current-type webbing guide and it is also difficult to properly maintain a gap through which the webbing passes. The increase of the manufacturing cost of the webbing guide eventually results in the increase of the manufacturing cost of the whole seat belt device.

SUMMARY OF THE INVENTION

The present invention has been made in view of the above-mentioned circumstances and it is an object of the present invention to provide a seat belt device which, while having a simple construction with the least increase of the cost, can maintain the favorable webbing winding performance by favorably and continuously guiding the webbing.

The above-mentioned object of the present invention can be obtained by a seat belt device comprising a webbing restraining a body of an occupant to a seat and a webbing guide for guiding the webbing in such a manner that the webbing guide comes into slide contact with the webbing, wherein the webbing guide includes an insert fitting, a covering resin which covers the insert fitting by molding, and a metal member with which the webbing comes into slide contact, and the metal member has a slide surface thereof which is brought into slide contact with the webbing protruded than the covering resin toward a webbing side.

The above-mentioned object of the present invention can be obtained by a seat belt device comprising a webbing restraining a body of an occupant to a seat and a webbing guide for guiding the webbing in such a manner that the webbing guide comes into slide contact with the webbing, wherein the webbing guide includes an insert fitting, a covering resin which covers the insert fitting by molding, and a metal member with which the webbing comes into slide contact, and the metal member has a slide surface thereof which is brought into slide contact with the webbing protruded more than the covering resin toward a webbing side.

In the seat belt device of the present invention, the webbing, which is guided by the webbing guide while coming into contact with the webbing guide, restrains the body of the occupant to the seat. The portion of the webbing guide which comes into slide contact with the webbing is a metal member. Accordingly, the adhesion of dust to the slide surface (that is, the metal member) of the webbing guide with which the webbing comes into slide contact can be suppressed and hence, the deterioration of the slide performance with the webbing which is generated as time lapses can be decreased whereby the favorable slide performance can be maintained.

The metal member may be mounted on a resin body after the resin body is formed by molding or the metal member may be integrally formed at the time of forming the resin body by molding.

A protruding quantity of the metal member is determined such that webbing does not come into contact with the resin body when the webbing slides over the metal member. When the webbing comes into contact with the resin body when the webbing slides over the metal member, the contact portion receives a relatively high friction and hence is worn. Since this wear decreases the winding performance of the seat belt and hence is not favorable, a protruding quantity of the metal plate is determined to a proper value which prevents the webbing from coming into contact with the resin body. This performance can be maintained even when the width of the metal plate becomes not more than the width of the webbing for achieving the reduction of the manufacturing cost and for making the device lightweight.

Further, in the seat belt device having the above mentioned constitution, by protruding the metal member more than the resin body toward a webbing side, the webbing is prevented from coming into contact with the resin body. Further by setting this protruding quantity to a proper value, even when the width of the metal member is not more than the width of the webbing, the widthwise end portions of the webbing do not come into contact with the resin body. This is because the webbing has a certain degree of rigidity against a curving thereof.

To take the above into consideration, with respect to the webbing guide used in the seat belt device having the above mentioned constitution, it is desirable that the width of the metal member is set to 35–55 mm and it is also preferable that a protruding quantity of the metal member is set to 0.05–1 mm. However, the width and the protruding quantity of the above mentioned metal member are not limited to these values.

To suppress the manufacturing cost, it is preferable to reduce the dimension of the metal member as small as possible so long as the dimension is enough for the practical use. According to the present invention, with the use of the metal member having the minimum dimension enough for the practical use, the webbing winding performance under the low friction can be maintained without incurring the large increase of the manufacturing cost. According to the present invention, by making the width of the metal member smaller than the width of the webbing, it becomes possible to further reduce the manufacturing cost.

In another seat belt device according to the present invention, the webbing which is guided by the webbing guide in a slide contact manner restrains the body of the occupant to the seat. The slide contact portion of the webbing guide which comes into contact with the webbing is made of the metal member. Both peripheral end portions of the metal member in the webbing widthwise direction are formed such that they are disposed at positions retracted from the webbing slide contact surface toward a side opposite to the webbing side and hence, the peripheral end portions and the webbing do not come into contact with each other. It is preferable that both ends of the metal member in the webbing widthwise direction are, for example, bent toward the covering resin or have a thickness thereof made thin compared with a surface of the metal member which mainly comes into slide contact with the webbing.

According to the present invention, since both peripheral end portions of the metal member in the webbing widthwise direction are disposed at positions retracted from the slide contact surface of the webbing toward the side opposite to the webbing side, even when the webbing is displaced or shifted in the widthwise direction, a gap is ensured between the metal member and the webbing due to the rigidity of the webbing and actions such as tension and hence, it becomes possible to prevent the webbing from coming into contact with the peripheral portions of the metal member.

Further, aiming at the reduction of the friction resistance of the metal member, it may be possible to apply a plating such as a chrome plating or a non-electrolytic plating. To further reduce the friction resistance, it may be possible to form a minute irregular surface (by a shot blasting, for example) on the surface of the metal member and thereafter to apply a plating treatment to the surface. Due to such provisions, the webbing winding performance is also enhanced. Further when the manufacturing cost is taken into consideration, a stainless steel member may be used as the metal member thus eliminating the plating treatment.

The metal member may be mounted on the covering resin after the covering resin is formed by molding or the metal member may be integrally formed with the covering resin at the time of forming the covering resin by molding.

To suppress the manufacturing cost, it is preferable that the dimension of the metal member is made as small as possible as long as the dimension is enough for the practical use. With the use of the metal member having the minimum dimension necessary for the practical use, the webbing winding performance under the low friction can be maintained without incurring the large increase of the manufacturing cost.

DETAILED DESCRIPTION OF THE PREFERRED EMBODIMENTS

Hereinafter, embodiments of the present invention are explained in detail in conjunction with attached drawings.

In a seal belt device, a webbing has an end portion thereof wound in a retractor such that webbing can be pulled out from the retractor and has the other end portion engaged with an anchor plate pivotally supported at a lower portion of a center pillar of a vehicle by way of a through anchor which constitutes a webbing guide. The webbing can restrain an occupant to a seat by having a through tongue which is arranged between the anchor plate and the through anchor engaged with a buckle mounted in an erected posture in the vicinity of the seat in a car body.

Figure 1:
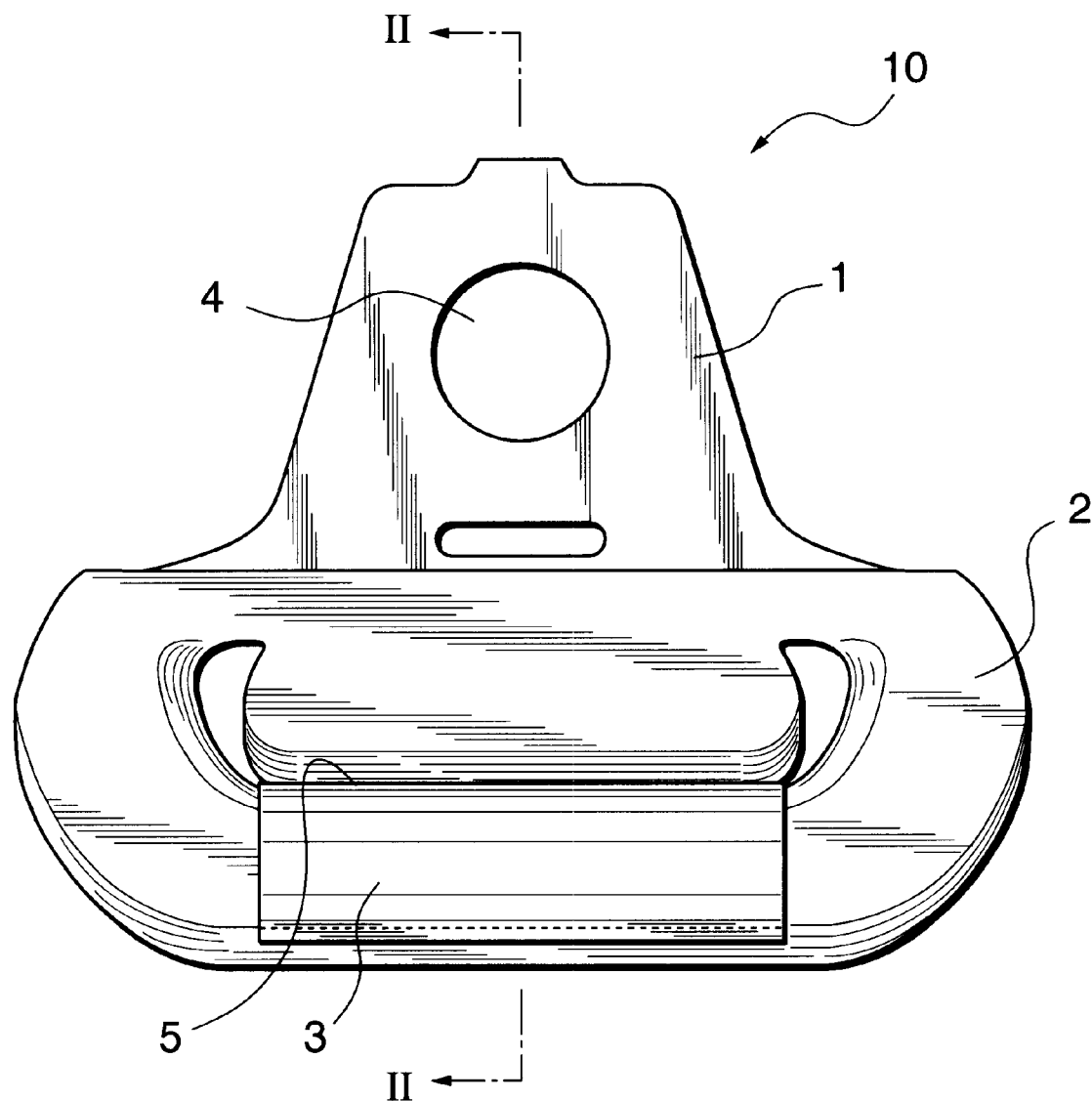
FIG. 1 is a front view showing a through anchor of a seat belt device according to a first embodiment of the present invention.
Figure 2:
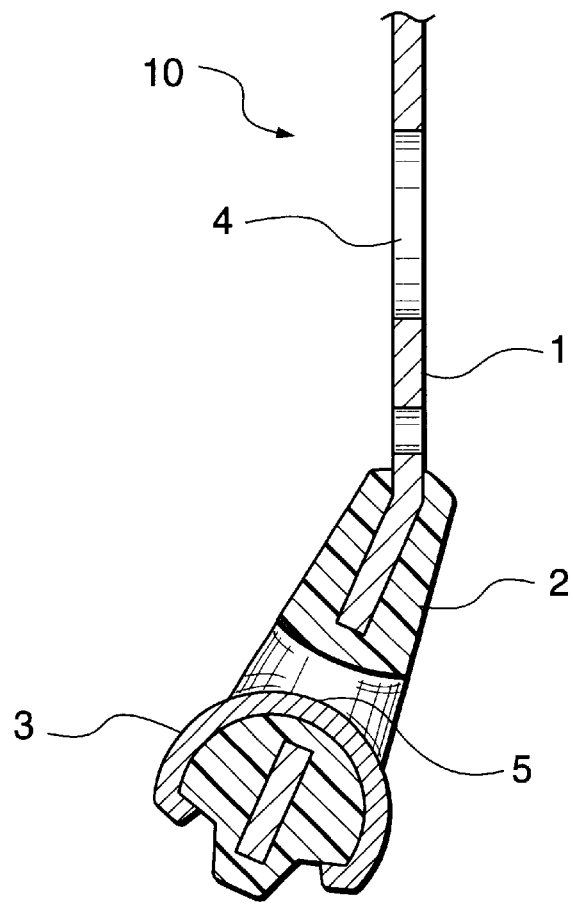
FIG. 2 is a cross-sectional view of the through anchor taken along a line II—II of FIG. 1.

Referring now to FIG. 1 and FIG. 2, the through anchor 10 is formed such that the covering resin 2 covers an insert fitting 1 by an integral molding, wherein the insert fitting 1 is produced by forming a sheet of metal sheet into a given shape.

In an upper portion (in the drawing) of the insert fitting 1, a bolt insertion hole 4, which allows a bolt or the like (not shown in the drawing) for rotatably supporting the through anchor 10 to the center pillar to pass therethrough, is formed. The insert fitting 1 is formed into a given shape by a blanking of a metal sheet such as a steel sheet or the like, for example, so as to ensure the load withstanding performance of the through anchor 10. As a material of the insert fitting 1, for example, a carbon steel product (JIS SC product) having a given thickness is named to withstand a given load. Further, a heat treatment may be applied to this insert fitting to make the insert fitting withstand a given load.

The covering resin 2 is formed by molding in a given shape around the insert fitting 1. The covering resin 2 is made of a resin having a high mechanical strength. As a specific example of the covering resin 2, a polyamide-based resin such as polyamide 6 or a resin which contains a reinforcement into polyacetal and polypropylene, or polycarbonate or the like is named.

By forming a thin metal plate 3 made of, for example, stainless steel, an iron based material, an aluminum alloy, a titanium alloy or the like which can withstand a given load into a curved shape and subsequently by fixedly securing such a metal plate 3 around the periphery of the covering resin 2 by wrapping, a slide contact surface 5 (hereinafter called "webbing slide contact surface 5") is formed on a portion of the surface of the metal plate 3. It is preferable to apply a plating treatment on the surface of this metal plate 3 so as to suppress the adhesion of the dust onto the surface thus maintaining the favorable slide performance. When the metal plate 3 is made of a stainless steel sheet, it is unnecessary to perform the plating treatment. As the plating, it is preferable to use any one of a chromium plating, a nickel plating, a non-electrolytic plating, a cobalt plating, a tin-cobalt plating and a hard chromium plating.

Figure 3:
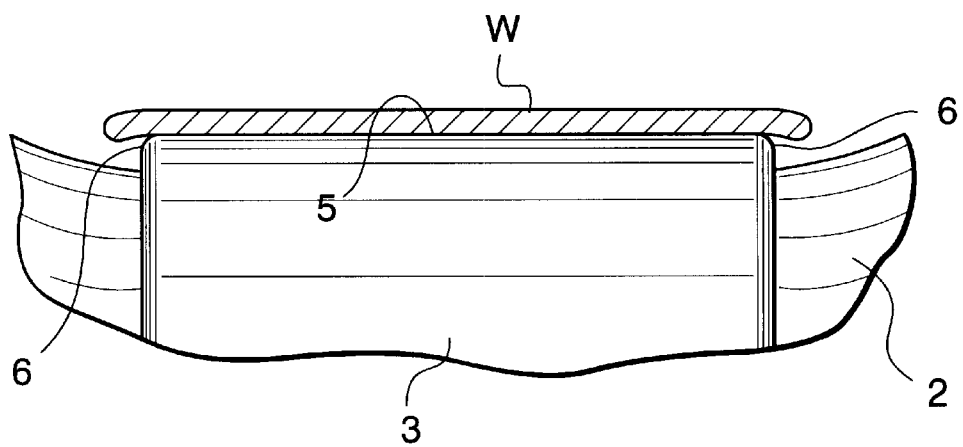
FIG. 3 is an enlarged view of a portion in the vicinity of a metal member of the through anchor of FIG. 1.

FIG. 3 shows the state that webbing W (shown in cross-section) is in a slide contact state with the metal plate 3. The metal plate 3 is protruded more than the surface of the covering resin 2. In this embodiment, although the width of the metal plate 3 is made slightly narrower than the width of the webbing W, since the contact surface of the metal plate 3 with the webbing W is positioned higher than the surface of the covering resin 2, there is no possibility that the widthwise end portions of the webbing W come into contact with the covering resin 2.

Subsequently, the manner of the operation of this embodiment is explained. In the seat belt device, the webbing W which restrains the occupant to the seat is made to pass through the webbing insertion gap of the through anchor 10 and is brought into a slide contact with the webbing slide contact surface 5 so that the webbing W is guided by the through anchor 10.

The through anchor 10 can bring the webbing W into slide contact with the webbing slide contact surface 5 and guides the webbing W with an excellent slide performance. Further, although the width of the webbing slide contact surface 5 is narrower than the width of the webbing W, since the webbing slide contact surface 5 is protruded more than the surface of the covering resin 2, the webbing W comes into contact with only the metal plate 3 which ensures a smooth slide movement of the webbing W. Accordingly, the slide movement of the webbing W with a low friction is maintained. It is preferable that peripheral portions 6 of the metal plate 3 are rounded to prevent the occurrence of damages on the webbing W.

As has been described above, according to the present embodiment, the through anchor 10 which constitutes the webbing guide is produced by covering the insert fitting 1 with the covering resin 2 by molding and a surface which comes into slide contact with the webbing W is formed by the metal member 3.

That is, according to this embodiment, after covering the insert fitting 1 with the covering resin 2 by molding, the metal plate 3 made of, for example, the iron-based material is fixedly secured to the periphery of the covering resin 2 by wrapping such that metal plate 3 is protruded more than the covering resin 2 toward the webbing W side so as to form the webbing slide contact surface 5. While achieving the reduction of the cost with the simple structure, the webbing W exhibits the least deterioration in its slide performance relative to the through anchor 10 even when time lapses so that the excellent slide performance can be maintained.

Experiment

Figure 4:
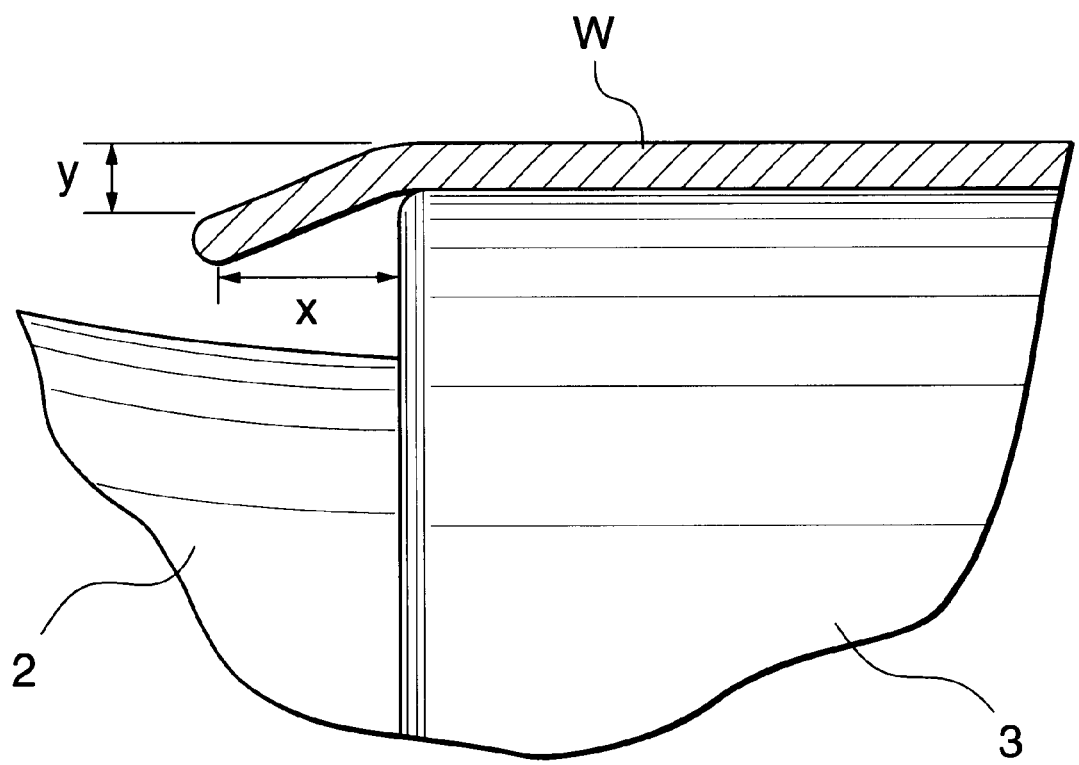
FIG. 4 is a side view with a part in cross section showing the manner of deformation of a webbing when the webbing is extended from the metal member.

Experiments performed with respect to a deformation quantity of the webbing in the case that the widthwise end portions of the webbing W are extended from the metal plate 3 are explained hereinafter. FIG. 4 shows the manner how the widthwise end portions of the webbing W are extended from the metal plate 3. The webbing W is extended from the metal plate 3 by an extension quantity x and the webbing W is deformed by deflection by a deformation quantity y. A device which measures the deformation quantity y to the extension quantity x is shown in FIG. 5.

Figure 5:
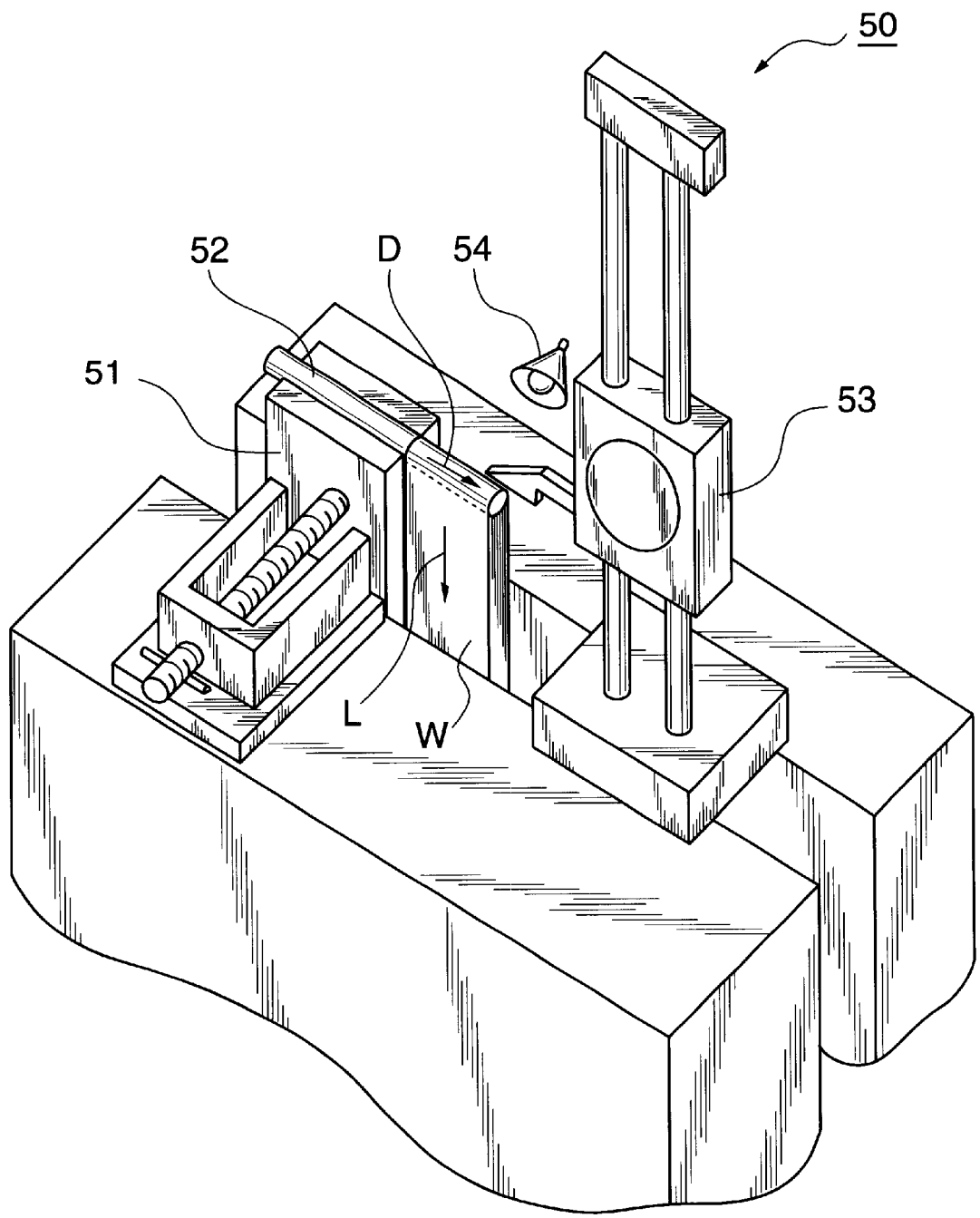
FIG. 5 is a perspective view of a device for measuring a deformation quantity of the webbing to an extension quantity of the webbing.

In the measuring device 50 shown in FIG. 5, an iron pipe 52 having a diameter of 15 mm is fixedly secured by a vice 51 with an extension quantity equal to the width of the webbing W and the pipe is considered as the webbing slide contact surface of the through anchor. The webbing W is wound around the iron pipe 52 and a load of 2.74 N (a pull-out force and a winding force of the webbing W being estimated and then a value twice as large as the winding force of 1.37 N being set as the load) is equally applied to both sides of the webbing W in a downward direction L.

Then, the webbing W is extended little by little in the widthwise direction D and the extension quantity x of the webbing W is measured by slide calipers (not shown in the drawing) and the deformation quantity y of the webbing W at this point of time is measured by a height gauge 53. With respect to an order of measurement, after confirming a reference point of the webbing wound around the iron pipe 52, the displacement of the extended distal end of the webbing W is measured as accurate as possible using a light source 54 and a magnifying glass (not shown in the drawings). Thereafter, by repeating this manipulation, measured values are obtained.

TABLE 1

| Extension quantity mm | 0.0 | 1.2 | 1.6 | 2.8 | 3.2 | 4.2 | 4.7 |
|---|---|---|---|---|---|---|---|
| Deformation Quantity mm | 0.00 | 0.07 | 0.17 | 0.19 | 0.18 | 0.23 | 0.32 |
| Extension quantity mm | 5.6 | 6.1 | 6.2 | 6.5 | 7.7 | 7.8 | 8.5 |
| Deformation Quantity mm | 0.33 | 0.36 | 0.34 | 0.21 | 0.35 | 0.45 | 0.35 |
| Extension quantity mm | 8.7 | 9.5 | 9.9 | 9.9 | 10.4 | 10.7 | 11.0 |
| Deformation Quantity mm | 0.40 | 0.37 | 0.46 | 0.43 | 0.48 | 0.53 | 0.46 |
| Extension quantity mm | 11.8 | 12.6 | 12.6 | 13.7 | 14.2 | 15.5 | |
| Deformation Quantity mm | 0.53 | 0.64 | 0.53 | 0.60 | 0.58 | 0.65 | |

Figure 6:
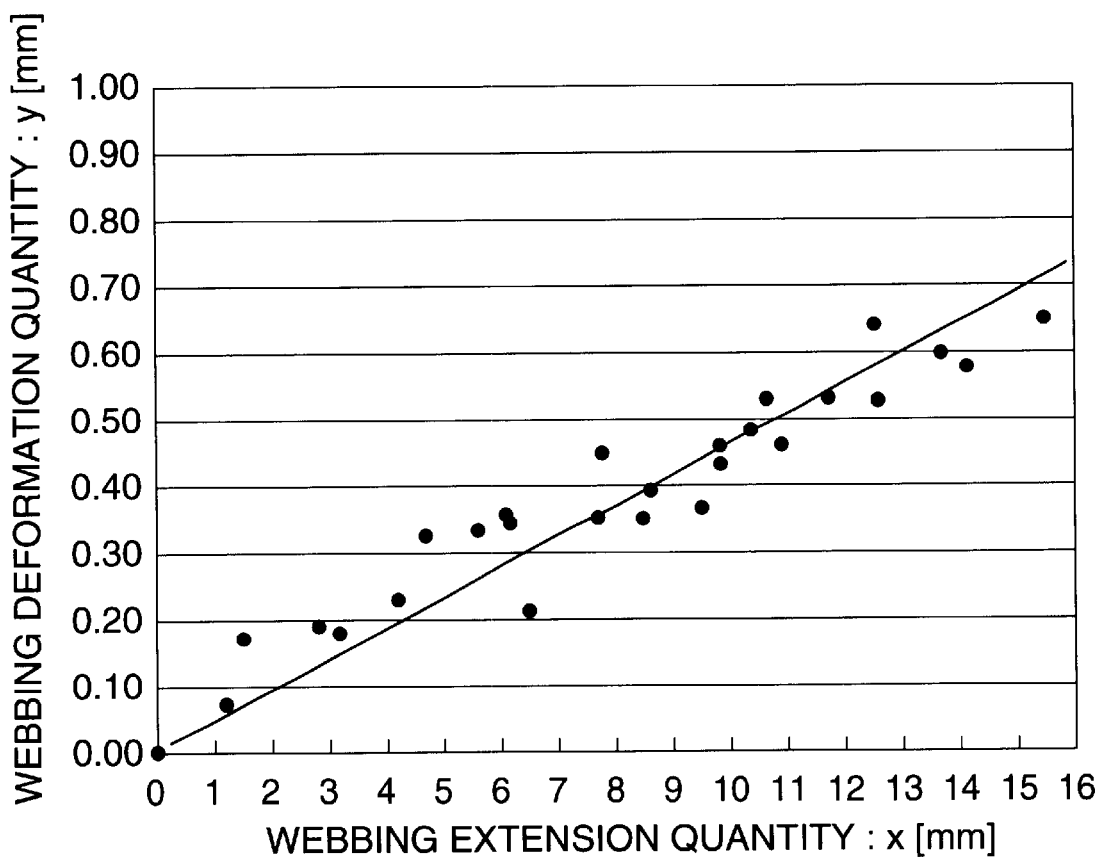
FIG. 6 is a graph which is prepared by plotting measured values of a deformation quantity of the webbing to an extension quantity of the webbing.

A result of the measurement performed using the device shown in FIG. 5 in the above-mentioned procedure is expressed in Table 1. A graph which plots these values in Table 1 is shown in FIG. 6. As can be understood from FIG. 6, an approximately proportional relationship is established between the extension quantity x and the deformation quantity y. The width and the protruding quantity of the metal plate 3 in the through anchor 10 can be selected from these results. For example, when the webbing W is extended from the metal plate 3 by the extension quantity of 6.2 mm, it is estimated that the deformation quantity at this point of time becomes approximately 0.34 mm and hence, the protruding quantity is determined to be 0.1 mm–1.0 mm in view of this deformation quantity.

Figure 7:
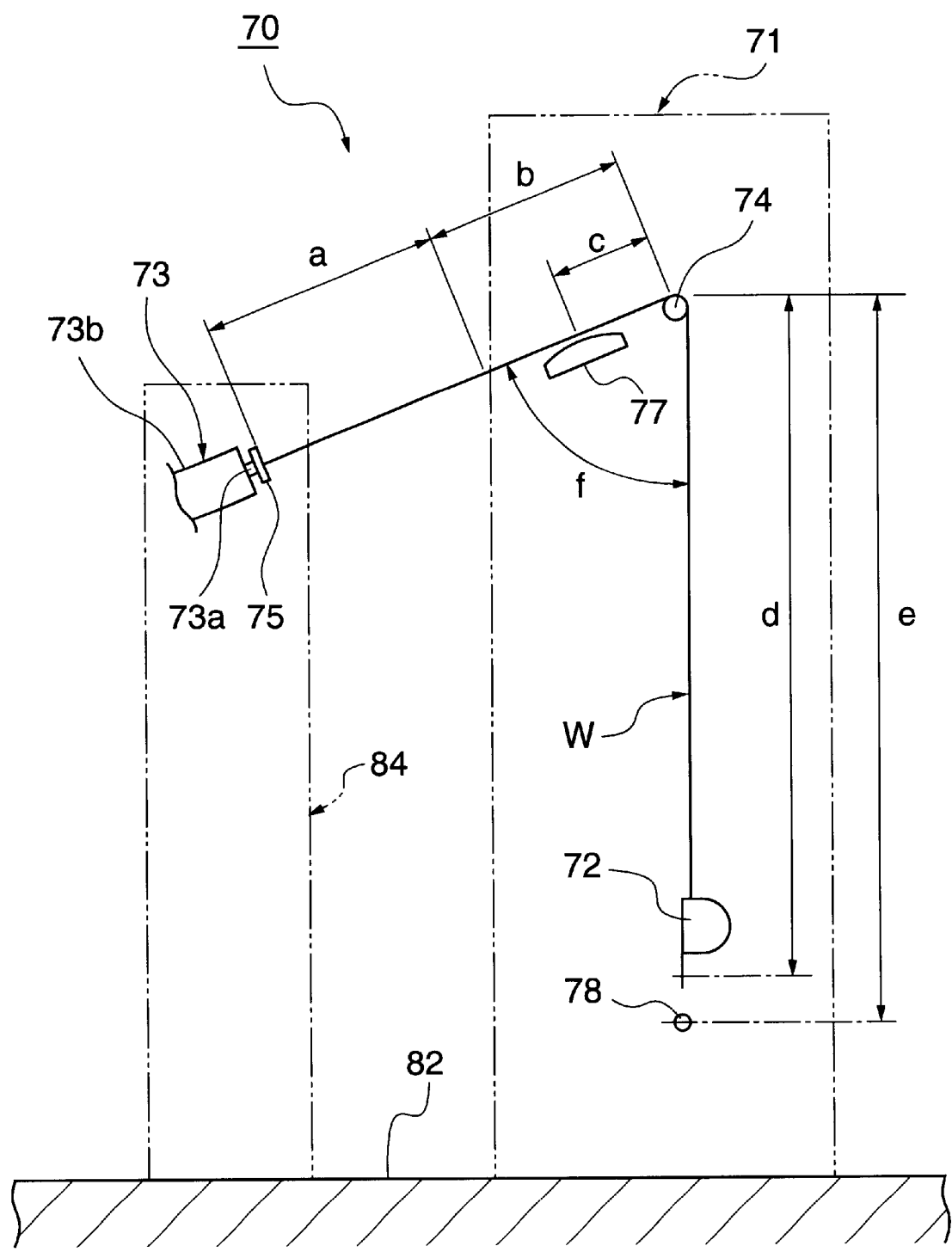
FIG. 7 is an explanatory view of a device for measuring the durability of the through anchor according to this embodiment of the present invention and a conventional through anchor.

Subsequently, a result of a comparison of durability (deterioration as time lapses) between the through anchor of this embodiment and a conventional through anchor is discussed. FIG. 7 is an excess retraction force tester for measuring an excess retraction force (a force to wind the webbing) of a through anchor.

As shown in FIG. 7, in the excess retraction force tester 70, a webbing W of a seat belt device held by a seat belt holding frame 71 is repeatedly subjected to the pull-out/winding operation of the retractor 72 in response to the operation of a pneumatic cylinder 73 for pulling-out/winding the webbing.

The seat belt holding frame 71 is mounted on a base 82 in an erected posture and the retractor 72, a through anchor 74, a simulation shoulder member 77 and the webbing W of the seat belt device are held at approximately equal positions as in the case that they are actually mounted on a vehicle. That is, the seat belt holding frame 71 supports the retractor 72 which is disposed in the vicinity of a proximal end portion (lower end portion in FIG. 7) and winds the webbing W therein, the through anchor 74 for allowing the webbing W to pass therethrough which is disposed in an upper end portion of the frame 71 in FIG. 7 away from the retractor 72 with a given vertical distance, and a simulation shoulder member 77 which is disposed in the vicinity of the through anchor 74.

The pneumatic cylinder 73 for pulling-out/winding the webbing is supported on a pneumatic cylinder support frame 84 in a given posture and the webbing W is fixedly secured to a mounting plate 75 which, in turn, is fixedly secured to a cylinder rod 73a by way of a hanger member or the like.

The pneumatic cylinder support 84 is fixedly secured to the base 82 while maintaining a given positional relationship with the seat belt supporting frame 71.

Corresponding to the advancing and the retracting of a cylinder rod 73a from a cylinder body 73b, the pneumatic cylinder 73 for pulling-out/winding a webbing first pulls out the webbing W which is in a state approximately equal to an unused state from the retractor 72 by a given quantity a to bring the webbing W into a state equal to an occupant confining state and then the retractor 72 is made to wind the webbing W until the pulled-out webbing W again takes a state approximately equal to the unused state, that is, by the given quantity a. In this experiment, the given quantity a is set to 500 mm.

With respect to the simulation shoulder member 77, the radius of curvature is set to approximately 500 mm and the mounting position of the simulation shoulder member 77 has its center set to a position offset from the through anchor 74 by a given quantity c. In this experiment, the given quantity c is set to 200 mm. A surface of the simulation shoulder member 77 is covered with a polyester cloth. After confirming whether a distal end of an upper surface of this polyester cloth comes into contact with the webbing W or not, in this experiment, the simulation shoulder member 77 is pushed by approximately 10 mm so as to make the simulation shoulder member 77 come into pressure contact with the webbing W and the simulation shoulder member 77 is set in this position.

The retractor 72 is positioned vertically below the through anchor 74 by a given quantity d. In this embodiment, the retractor 72 is positioned approximately 690 mm below the through anchor 74. Further, an angle which the webbing W makes by way of the through anchor 74 is set to f in a side view and is set to 70° in this embodiment. In a plan view, such an angle is set to 45°.

Further, a lap outer anchor portion 78 is provided vertically below the through anchor 74 by a given quantity e. In this embodiment, the lap outer anchor portion 78 is positioned approximately 780 mm below the through anchor 74. This lap outer anchor portion 78 is used for measuring an excess retraction force. That is, the webbing W which is mounted on the pneumatic cylinder 73 for pulling-out/winding a webbing is removed from the pneumatic cylinder 73. Then, the webbing W is mounted on the lap outer anchor portion 78. Subsequently, a weight is suspended from the webbing W to measure the excess retraction force.

In this embodiment, as a sample which exhibits a deterioration tendency similar to an actual deterioration which occurs as time lapses, an artificial sebum liquid is coated. Various known artificial sebum liquids may be used as the artificial sebum liquid. For example, in this embodiment, an artificial sebum liquid which uses an oleic acid and protein and the like as organic components and mud as an inorganic component is used.

The experiment was performed as follows. A given quantity of artificial sebum liquid having such composition was coated on the surface of the simulation shoulder member 77 once every 100 times of pulling-out/winding operation (one operation consisting of one pulling-out and one winding). Then, after every given times of pulling-out/winding operation, a weight having a mass of 5 g unit is mounted on the webbing W which is mounted on the lap outer anchor portion 78. In this embodiment, the excess retraction force [N] was calculated from the mass of this weight. A sample A is the through anchor when the protruding quantity of the metal plate 3 is 0.3 mm and the width of the metal plate 3 is 47 mm. Further, a sample B is the through anchor where the protruding quantity of the metal plate 3 is set to 0 mm and the width of the metal plate 3 is set to 47 mm.

Figure 8:
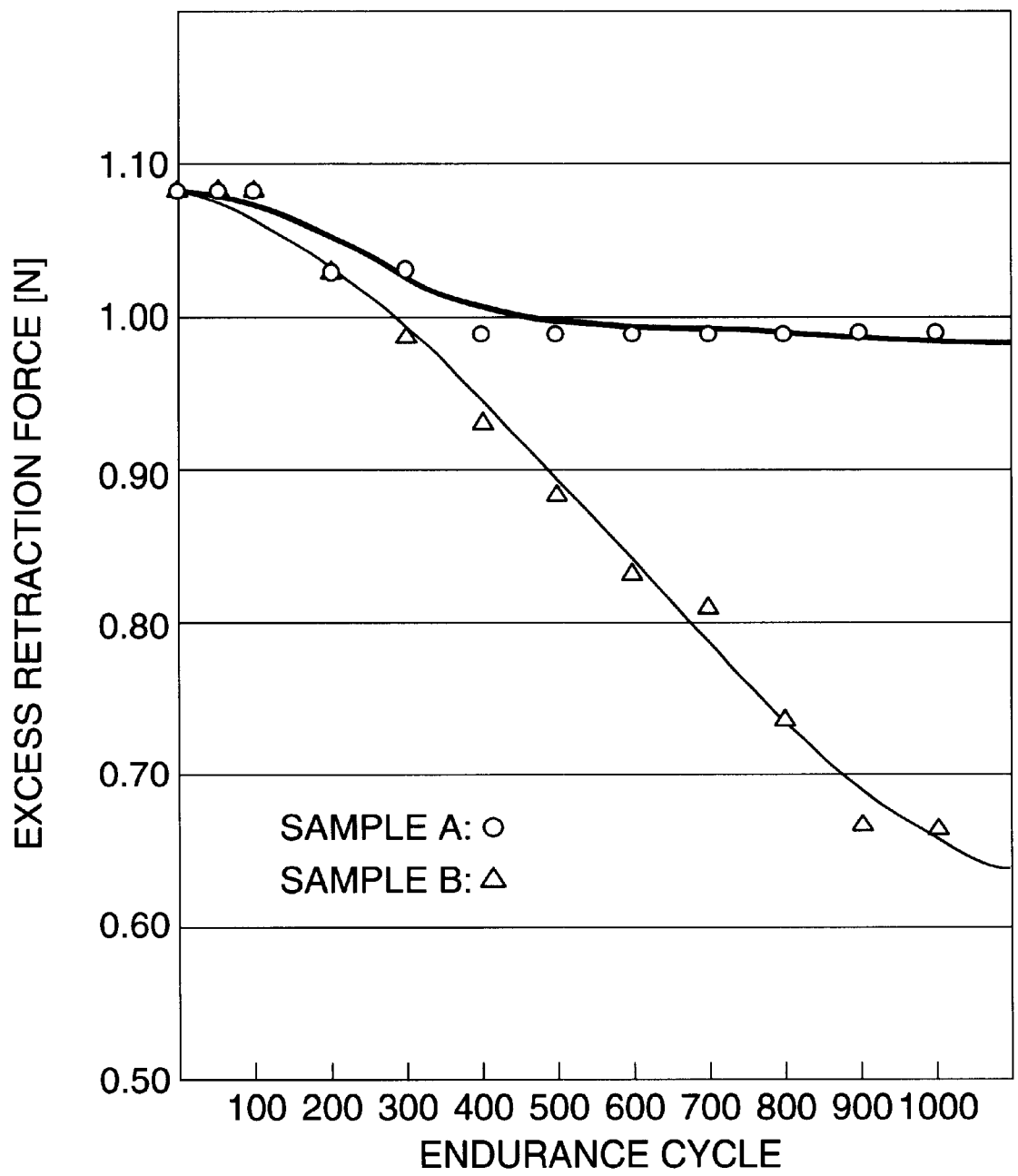
FIG. 8 is a graph which is prepared by plotting the measured values of the measurement performed by the device shown in the FIG. 7.

A result of the above-mentioned experiment is shown in Table 2 and a graph which is prepared by plotting the values in Table 2 is shown in FIG. 8. In Table 2 and FIG. 8, the sample A is the through anchor of a type which is used in the embodiment of the present invention and the sample B is the above-mentioned through anchor of a type which has the protruding quantity of 0 mm.

deterioration which occurs as time passes was relatively large. To the contrary, it was recognized that with respect to the sample A which is the subject of the present invention, the deterioration which occurs as time lapses was hardly recognized and the excess retraction force can be maintained at a fixed value in a stable manner. Further, the difference between the sample A and the sample B resides only in the protruding quantity of the metal plate and hence, it has become apparent that a factor which has brought about such a difference in the results is mainly the protruding quantity of the metal plate.

The second embodiment of the present invention is explained hereinafter.

Figure 9:
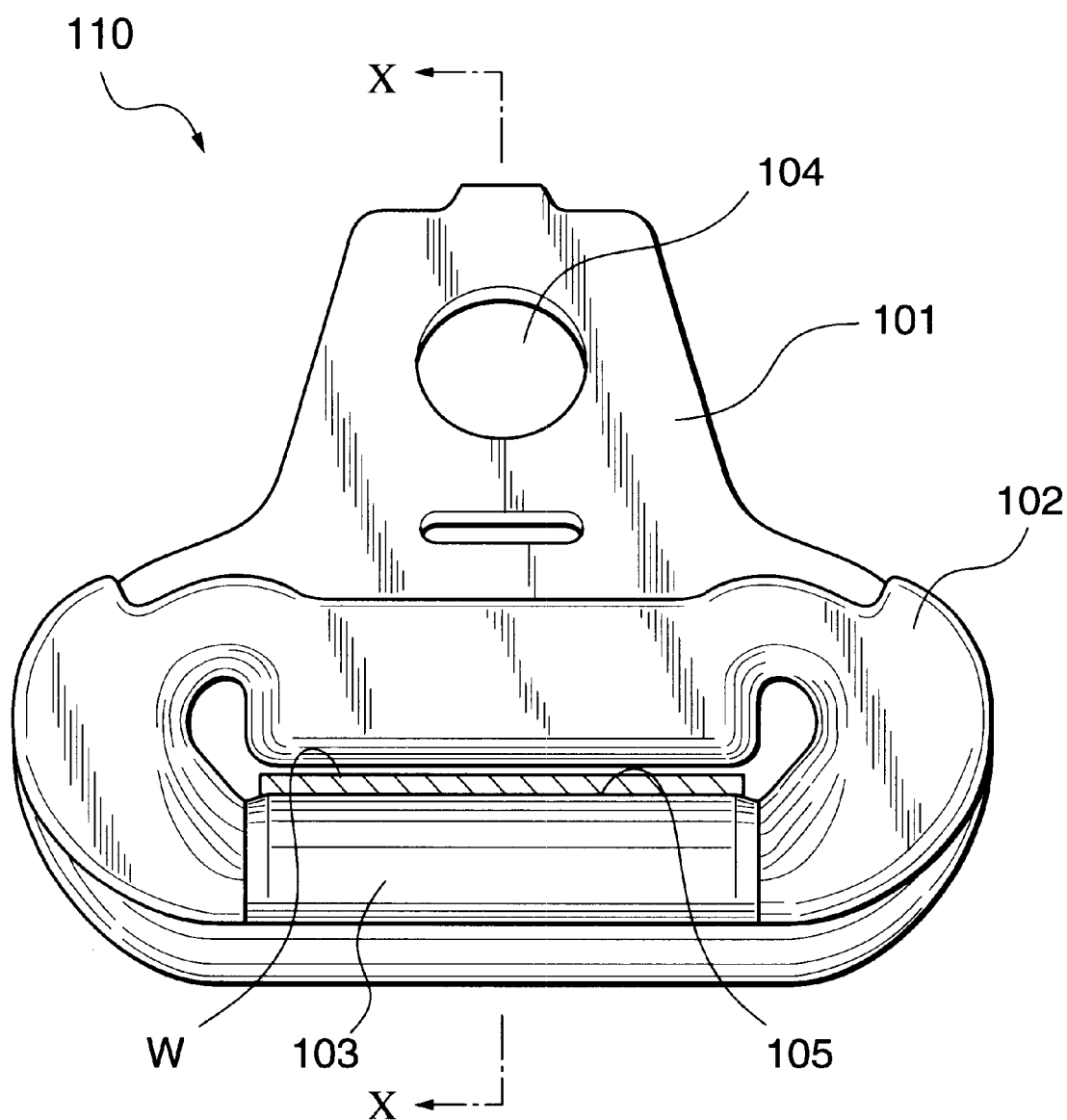
FIG. 9 is a front view showing a through anchor of a seat belt device according to a second embodiment of the present invention.
Figure 10:
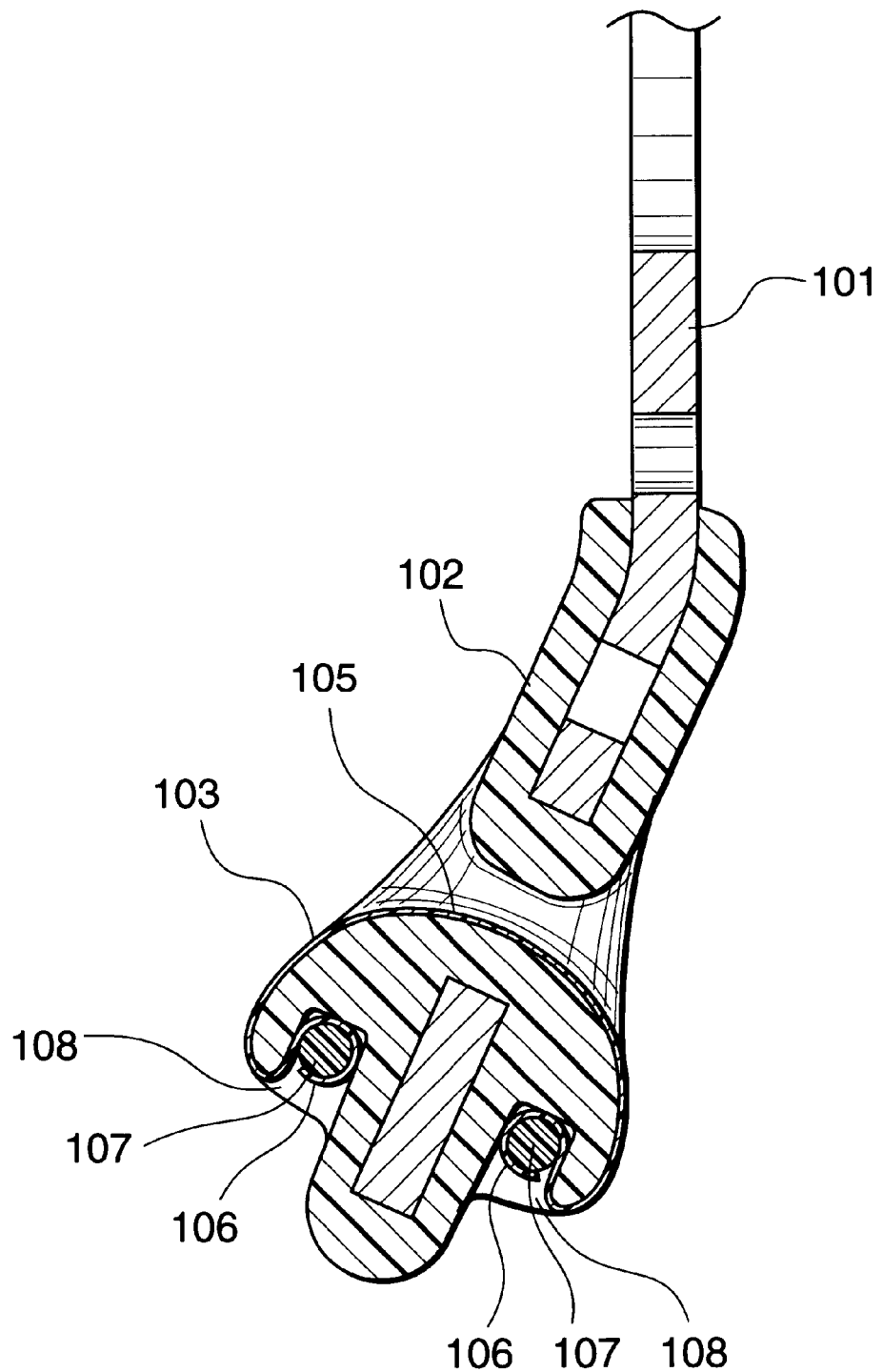
FIG. 10 is a cross-sectional view of the through anchor shown in FIG. 9 taken along a line X—X.

Referring now to FIG. 9 and FIG. 10, the through anchor 110 is integrally formed by covering an insert fitting 101 which is formed into a given shape from a sheet of metal sheet with a covering resin 102 by molding.

TABLE 2

Result of accelerated durability

| Endurance Cycle | 0 | 50 | 100 | 200 | 300 | 400 | 500 | 600 | 700 | 800 | 900 | 1000 | after replacing with new through anchor |
|---|---|---|---|---|---|---|---|---|---|---|---|---|---|
| Excess Retraction force of sample A | 1.08 | 1.08 | 1.08 | 1.03 | 1.03 | 0.98 | 0.98 | 0.98 | 0.98 | 0.98 | 0.98 | 0.98 | 1.03 |
| Excess Retraction force of sample B | 1.08 | 1.08 | 1.08 | 1.03 | 0.98 | 0.93 | 0.88 | 0.83 | 0.78 | 0.74 | 0.67 | 0.67 | 0.83 |

As can be clearly understood from Table 2 and FIG. 8, according to the sample A of this embodiment, the result of the experiment exhibits the small lowering of the excess retraction force until the durability cycle becomes 1000. After the 1000th measurement, the through anchor was replaced with a new through anchor and the deterioration of the webbing was measured. From the result of such a measurement, it was found that the lowering of the excess retraction force due to the webbing is 0.05 N. Accordingly, it was found that the lowering of the excess retraction force due to the through anchor was 0.05 N and hence is extremely small. To the contrary, in case of the sample B, the lowering of the excess retraction force became outstanding from the durability cycle of approximately 400 times and the excess retraction force was lowered by 0.41 N at the duration cycle of 1000 times compared with the initial value. The through anchor which constitutes the sample B was replaced with a new through anchor and the deterioration of the webbing was measured as in the case of the sample A. The result of the measurement exhibits that the lowering of the excess retraction force due to the webbing was 0.25 N and the lowering of the excess retraction force due to the through anchor was 0.16 N. It was found that the lowering of the excess retraction force was extremely large compared with that of the sample A. In addition, a gum stain was found on the covering resin in the vicinity of a webbing slide portion of the through anchor after the test. In view of the above results, it is understood that with the use of the through anchor of this embodiment, the lowering of the slide performance of the through anchor and the webbing can be remarkably suppressed compared with the case in which the protruding quantity is set to 0 mm. Further, it was found that although the sample B could exhibit the relatively large value with respect to the initial excess retraction force, the In an upper portion of an insert fitting 101 in the drawing, a bolt insertion hole 104, which allows a bolt or the like (not shown in the drawing) to pass therethrough for rotatably supporting the through anchor 110 to a center pillar, is formed. The insert fitting 101 is, for example, formed into a given shape by a blanking of a metal sheet such as a steel sheet and ensures the load resistance performance of the through anchor 110.

The covering resin 102 is formed around the insert fitting 101 by molding such that the covering resin 102 can have a given shape. The covering resin 102 is made of resin having a high mechanical strength.

By forming a thin metal plate 103 made of a stainless steel, an iron based material, an aluminum alloy, a titanium alloy or the like which can withstand a given load into a curved shape, for example, and fixedly securing the metal plate around the periphery of the covering resin 102 by wrapping, a slide contact surface 105 (hereinafter called "webbing slide contact surface 105") which is brought into slide contact with the webbing W is formed on a portion of the surface of the metal plate 103. It is preferable to apply a plating treatment on the surface of this metal plate 103 so as to prevent the adhesion of the dust to the metal plate 103 and thereby to maintain the favorable slide performance. When the metal plate 103 is made of a stainless steel sheet, it is unnecessary to perform the plating treatment.

As specifically shown in FIG. 10, portions disposed in the vicinity of end portions 106 of the metal plate 103 along the sliding direction of the webbing W are bent and inserted into grooves 108 formed in a lower portion of the covering resin 102 and are fixedly secured thereto by fixing bars 107. Further, it is preferable that after being wrapped around the covering resin 102, the metal plate 103 has end portions 106 thereof bent and inserted into the grooves 108 and thereafter the fixing bars 107 are inserted into the grooves 108 to secure the metal plate 103 to the grooves.

Figure 11:
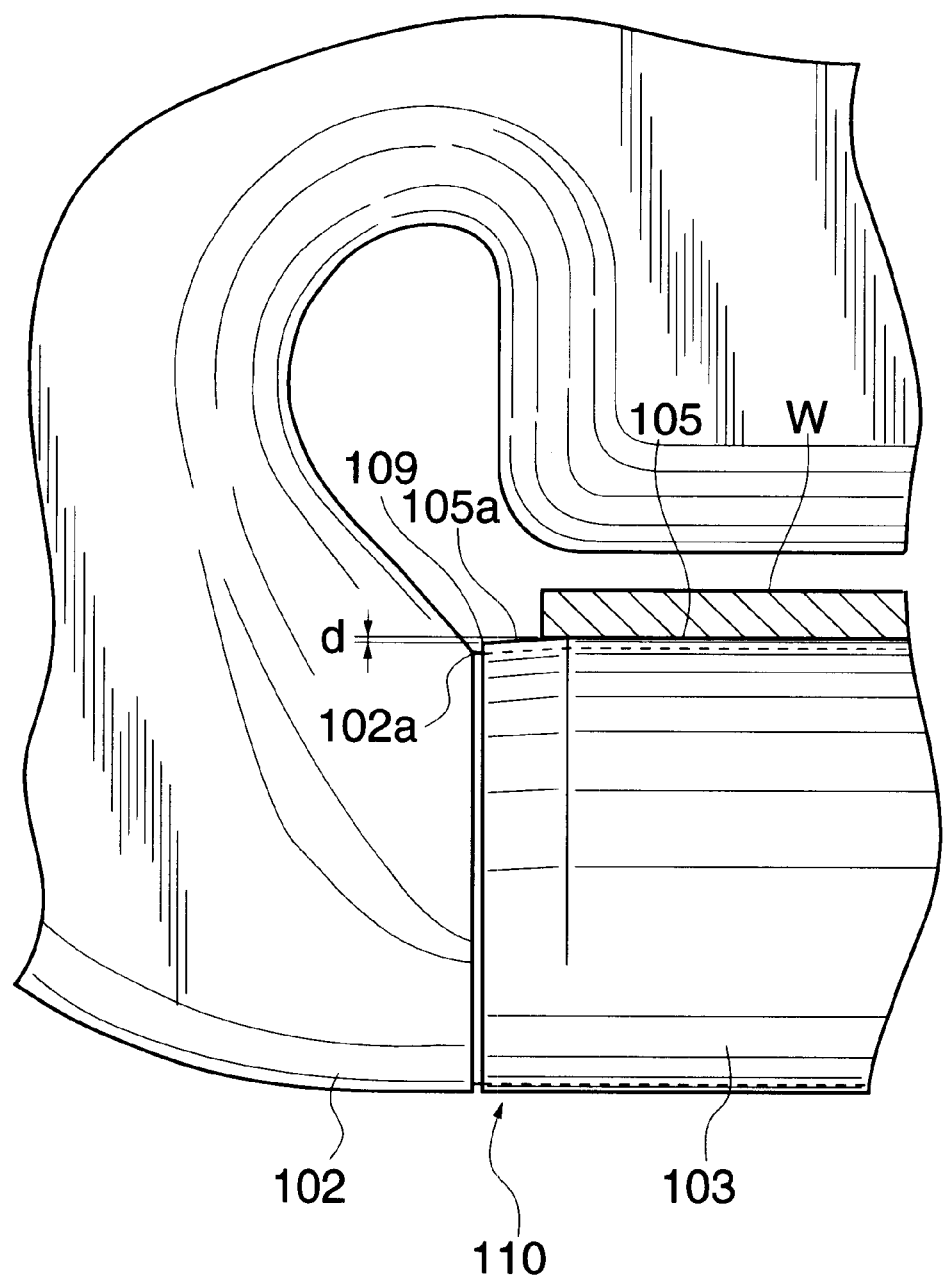
FIG. 11 is an enlarged view of a portion in the vicinity of an end portion of a metal member of the through anchor shown in FIG. 9.

Referring now to FIG. 11, end portions 105*a* of the metal plate 103 in the webbing widthwise direction (left and right direction in the drawing) are bent toward a side opposite to a webbing side than the webbing slide contact surface 105 by a dimension d. It is preferable that the end portions 105*a* of the metal plate 103 have rounded ends.

Subsequently, the manner of operation of this embodiment is explained. In the seat belt device, the webbing W which restrains an occupant to a seat is made to pass through a webbing insertion gap of the through anchor 110 and is brought into slide contact with the webbing slide contact surface 105 whereby the webbing W is guided by the through anchor 110.

The through anchor 110 ensures the slide contact between the webbing W and the webbing slide contact surface 105 with an excellent slide performance and guides the webbing W. Further, since the end portions 105*a* of the metal plate 103 in the webbing widthwise direction are disposed at a position retracted toward the side opposite to the webbing side than the slide contact surface of the webbing W, even when the webbing W is displaced in the widthwise direction, a gap is ensured between the metal plate 103 and the webbing W due to the rigidity of the webbing W and actions such as a tension or the like whereby it becomes possible to prevent the webbing W from coming into contact with peripheral portions 109 of the metal plate 103. Therefore, a phenomenon that a scuffing, which occurs as the surface of the webbing W comes into contact with the peripheral portions 109, can be prevented in advance. Accordingly, the sliding of the webbing W with the least friction can be maintained.

Further, the through anchor 110 is constituted by covering the insert fitting 104 with the covering resin 102 by molding and thereafter wrapping the metal plate 103 around the surface of the covering resin 102 on which the webbing W slides so that the favorable slide performance can be realized without incurring the large increase of the cost.

Figure 12:
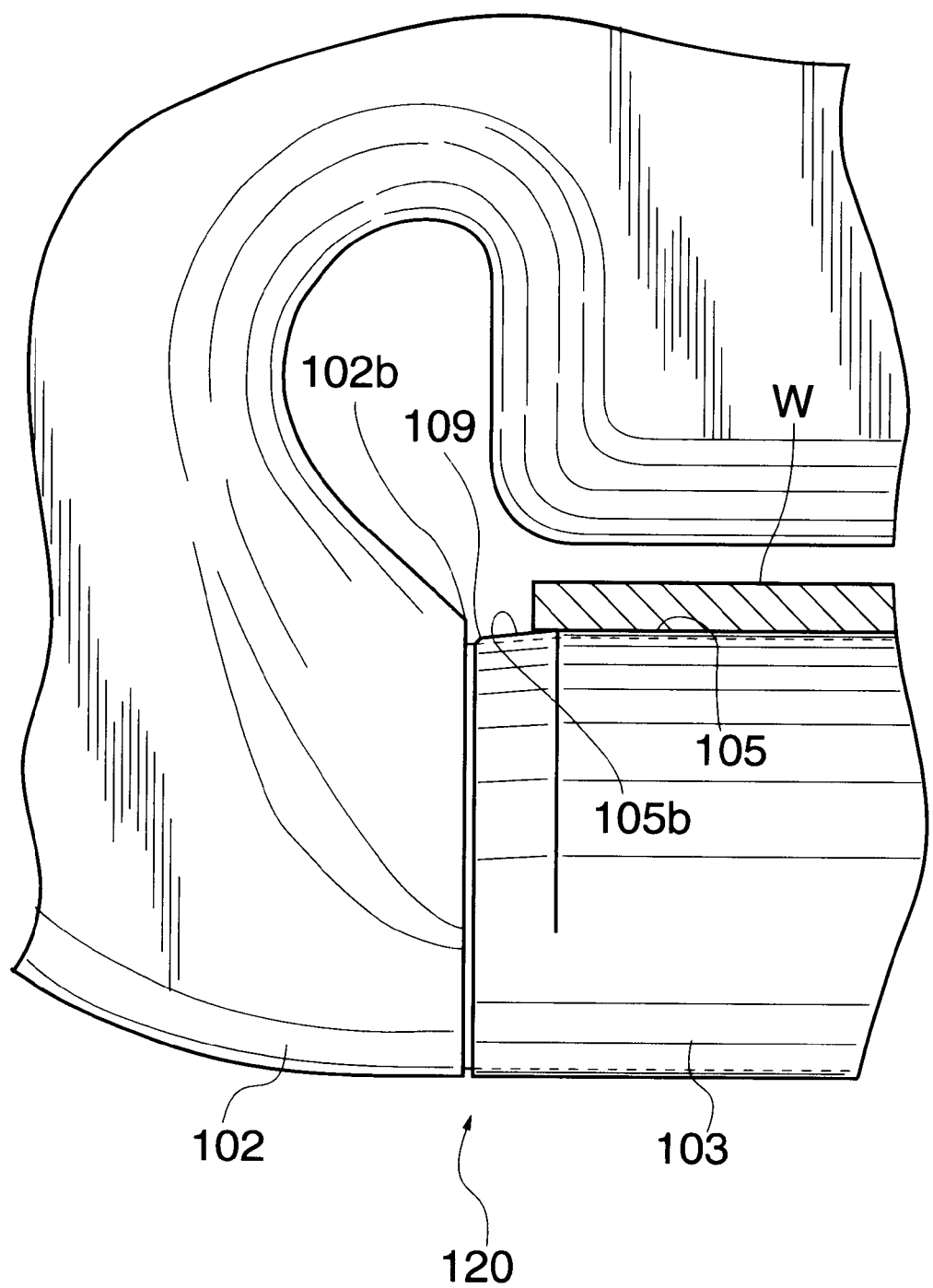
FIG. 12 is an enlarged view of a portion in the vicinity of an end portion of a metal member of a through anchor of a third embodiment.

Subsequently, referring now to FIG. 12, a through anchor 120 employed in the third embodiment of the present invention is shown in the drawing. This through anchor 120 has approximately the equal shape and constitution as those of the through anchor 110 of the second embodiment except for that the shape of end portions 105*b* of a metal plate 103 in the widthwise direction of the webbing W is different from the shape of the end portions 105*a* of the metal plate 103 in the through anchor 110 of the second embodiment. Accordingly, the explanation of parts identical with those of the second embodiment is omitted.

The difference of the third embodiment from the second embodiment lies in the positional relationship between the peripheral portions 109 of the metal plate 103 and the end portions 102*b* of the covering resin 102. While the peripheral portions 109 in the second embodiment are disposed at a position higher than the peripheries 102*a* (see FIG. 11) of the covering resin 102 in the drawing, the peripheral portions 109 in the third embodiment are disposed at a position lower than the peripheries 102*b* of the covering resin 102 in the drawing. Due to such a constitution, in combination with the action brought about by the second embodiment, it becomes possible to prevent more effectively the possibility that the webbing W comes into contact with the peripheral portions 109 of the metal 103 so that the phenomenon that the webbing W is scuffed can be prevented more effectively.

Figure 13:
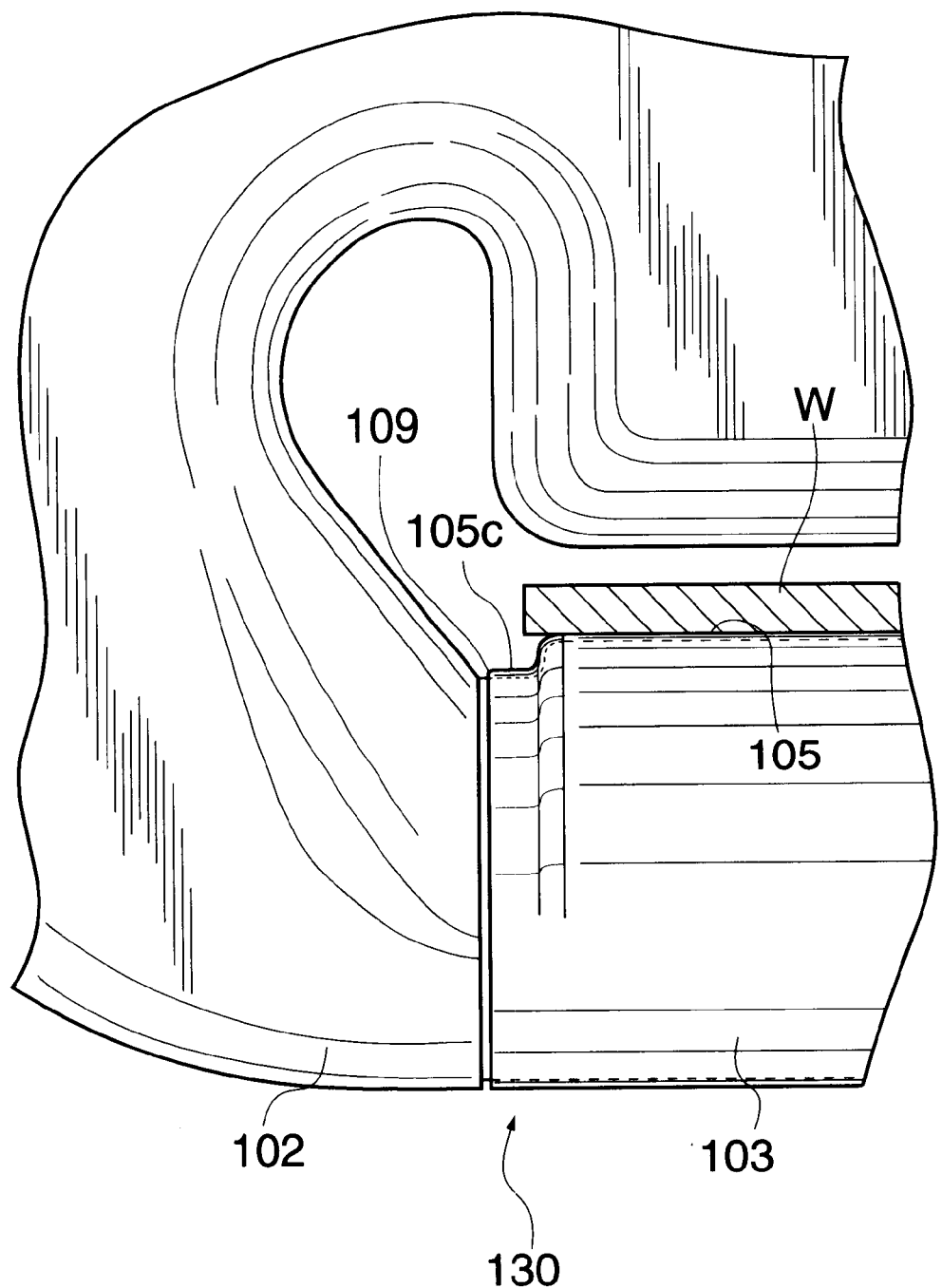
FIG. 13 is an enlarged view of a portion in the vicinity of an end portion of a metal member of a through anchor of a fourth embodiment.
Figure 14:
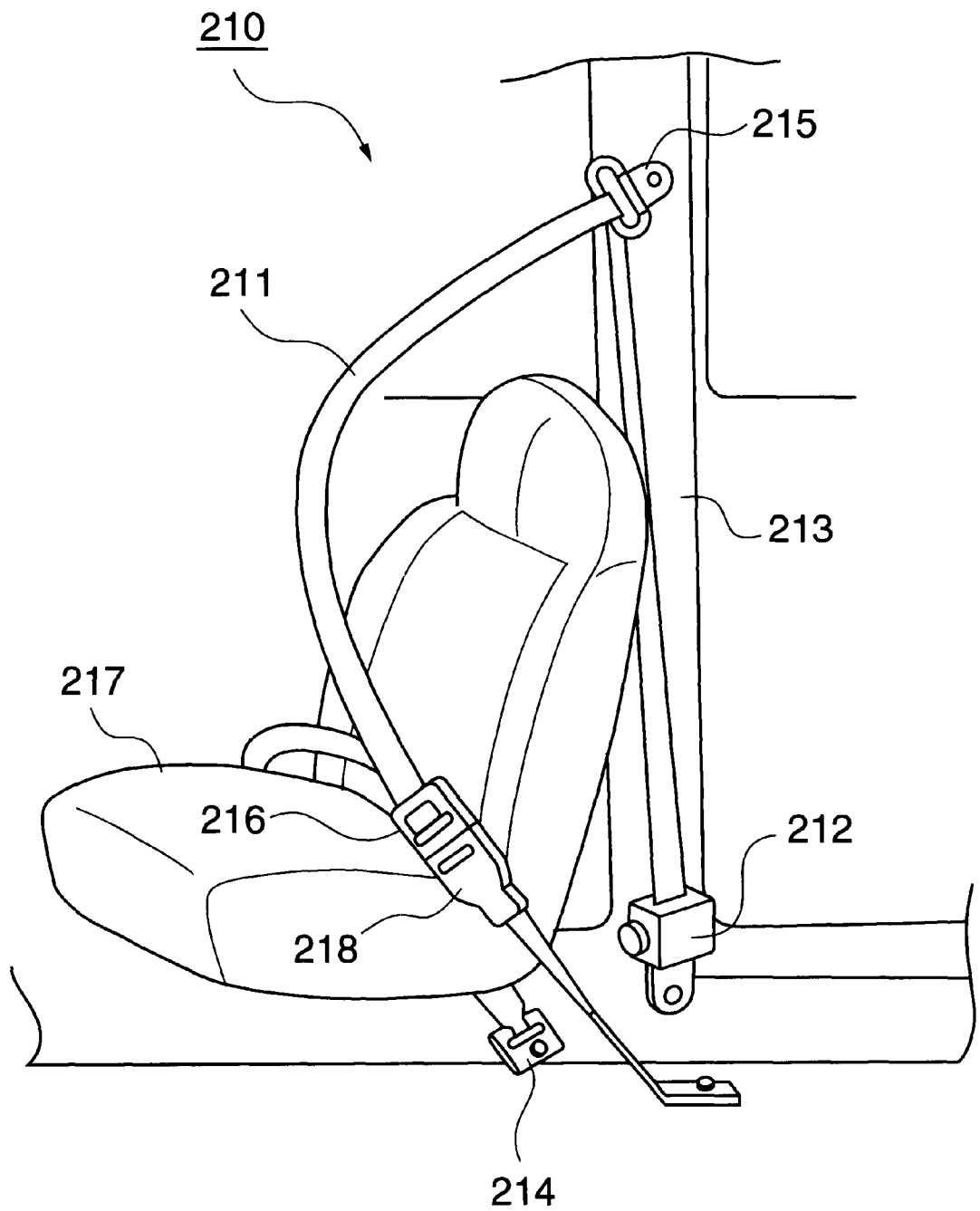
FIG. 14 is a schematic view showing a conventional seat belt device.

Referring now to FIG. 13, a through anchor 130 employed in the fourth embodiment of the present invention is shown in the drawing. This through anchor 130 has the approximately equal shape and constitution as those of the through anchor 110 of the second embodiment except for that the shape of end portions 105*c* of a metal plate 103 in the widthwise direction of the webbing W is made different from the shape of the end portions 105*a* of the metal plate 103 in the through anchor 110 of the second embodiment. Accordingly, the explanation of parts identical with those of the second embodiment is omitted.

The difference of the fourth embodiment from the second embodiment lies in the shape of end portions 105*c* of a metal plate 103. That is, while the end portions 105*a* in the second embodiment have a tapered shape, the end portions 105*c* in the fourth embodiment are bent with steps. It is preferable that stepped portions of the end portions 105*c* are smoothly bent. Due to such a constitution, in combination with the action brought about by the second embodiment, it becomes possible to prevent more effectively the possibility that the webbing W comes into contact with the peripheral portions 109 of the metal 103 so that the phenomenon that the webbing W is scuffed can be prevented more effectively.

Although several embodiments of the present invention have been explained heretofore, the present invention is not limited to the above-mentioned embodiments and suitable modifications and improvements can be made. For example, without mounting the metal member wrapped on the covering resin, the metal member may be integrally formed with the covering resin by an insert molding. Further, it may be possible that a slide portion may be formed by a part of the insert fitting and the slide portion is exposed from the covering resin so as to form a metal member which comes into slide contact with the webbing from this slide portion.

What is claimed is:

1. A seat belt device comprising:

a webbing restraining a body of an occupant to a seat, and a webbing guide for guiding said webbing in such a manner that said webbing guide comes into slide contact with said webbing, wherein said webbing guide includes an insert fitting, a covering resin which covers said insert fitting by molding, and a metal member with which said webbing comes into slide contact, and said metal member has a slide contact surface thereof which comes into slide contact with said webbing protruded more than said covering resin toward a webbing side.

2. A seat belt device comprising:

a webbing restraining a body of an occupant to a seat, and a webbing guide for guiding said webbing in such a manner that said webbing guide comes into slide contact with said webbing, wherein said webbing guide includes:

an insert fitting, a covering resin which covers said insert fitting by molding, and a metal member with which said webbing comes into slide contact, and said metal member has a slide contact surface thereof which comes into slide contact with said webbing protruded more than said covering resin toward a webbing side, wherein a width of said metal member is not more than a width of said webbing.

3. A seat belt device according to claim 1, wherein said metal member is a metal plate wrapped around said covering resin.

4. A seat belt device according to claim 1, wherein said metal member is a metal plate integrally formed with said covering resin by an insert molding.

5. A seat belt device according to claim 1, wherein a plating treatment is applied to a surface of said metal member.

6. A seat belt device according to claim 1, wherein said metal member is formed of a stainless steel plate.

7. A seat belt device according to claim 1, wherein end peripheral portions of said metal member in the webbing widthwise direction are rounded.

8. A seat belt device comprising:
   a webbing restraining a body of an occupant to a seat, and
   a webbing guide for guiding said webbing in such a manner that said webbing guide slidably comes into contact with the webbing,
   wherein said webbing guide includes
   an insert fitting,
   a covering resin which covers said insert fitting by molding, and
   a metal member with which said webbing comes into slide contact, and both end peripheral portions of said metal member in the webbing widthwise direction on a surface side with which said webbing comes into contact are disposed at a position retracted from a webbing slide contact surface toward a side opposite to a webbing side.

9. A seat belt device according to claim 8, wherein both end peripheral portions of said metal member in the webbing widthwise direction are formed into a tapered shape such that said end portions are retracted from said webbing slide contact surface toward said side opposite to said webbing side.

10. A seat belt device according to claim 8, wherein both end peripheral portions of said metal member in the webbing widthwise direction are bent with steps such that said end portions are retracted from said webbing slide contact surface toward said side opposite to said webbing side.

11. A seat belt device according to claim 8, wherein said metal member is a metal plate wrapped around said covering resin.

12. A seat belt device according to claim 11, wherein grooves extending in the webbing widthwise direction are formed in said covering resin and end portions of said metal plate as viewed in the webbing slide direction are accommodated in the insides of said grooves.

13. A seat belt device according to claim 12, wherein said seat belt device is further provided with securing members for urging said end portions of said metal plate accommodated in the insides of said grooves.

14. A seat belt device according to claim 8, wherein said metal member is a metal plate integrally formed with said covering resin by an insert molding.

15. A seat belt device according to claim 8, wherein a minute irregular surface treatment is applied to a surface of said metal member.

16. A seat belt device according to claim 8, wherein a plating treatment is applied to a surface of said metal member.

17. A seat belt device according to claim 8, wherein said metal member is formed of a stainless steel plate.

* * * * *